No. 739,796. PATENTED SEPT. 22, 1903.
S. W. WARDWELL.
WINDING MACHINE.
APPLICATION FILED OCT. 2, 1901.
NO MODEL. 9 SHEETS—SHEET 1.

Fig.1.

WITNESSES
INVENTOR
Simon W. Wardwell
BY
ATTORNEYS

Fig. 2.

No. 739,796. PATENTED SEPT. 22, 1903.
S. W. WARDWELL.
WINDING MACHINE.
APPLICATION FILED OCT. 2, 1901.

NO MODEL. 9 SHEETS—SHEET 3.

WITNESSES
E. Harrener
Wm. Gillman Jr.

INVENTOR
Simon W. Wardwell
BY
Fisk & Freeman,
ATTORNEYS

No. 739,796. PATENTED SEPT. 22, 1903.
S. W. WARDWELL.
WINDING MACHINE.
APPLICATION FILED OCT. 2, 1901.
NO MODEL. 9 SHEETS—SHEET 7.

WITNESSES
INVENTOR
Simon W. Wardwell
BY
ATTORNEYS

No. 739,796. PATENTED SEPT. 22, 1903.
S. W. WARDWELL.
WINDING MACHINE.
APPLICATION FILED OCT. 2, 1901.
NO MODEL. 9 SHEETS—SHEET 9.

WITNESSES
INVENTOR
ATTORNEYS

No. 739,796.

Patented September 22, 1903.

UNITED STATES PATENT OFFICE.

SIMON WILLARD WARDWELL, OF PROVIDENCE, RHODE ISLAND, ASSIGNOR TO UNIVERSAL WINDING COMPANY, OF PORTLAND, MAINE, A CORPORATION OF MAINE.

WINDING-MACHINE.

SPECIFICATION forming part of Letters Patent No. 739,796, dated September 22, 1903.

Application filed October 2, 1901. Serial No. 77,332. (No model.)

*To all whom it may concern:*

Be it known that I, SIMON WILLARD WARDWELL, a citizen of the United States, residing at Providence, in the county of Providence and State of Rhode Island, have invented certain new and useful Improvements in Winding-Machines, of which the following is a specification.

My invention comprises improvements in winding-machines, and relates particularly to devices for winding interchangeably on one machine packages of different types and also to means for controlling the delivery of yarn when winding from rotating supplies.

The features of construction and principles of operation peculiar to my improved machine are fully set forth in the following specification and illustrated by the accompanying drawings, of which—

The machine described in my specification comprises a plurality of winding units mounted in two rows, back to back, on a common bed, all driven through gearing from a common "gainer" mechanism, whereby the speed relation of the winding-spindles and of the cams is controlled. Each winding unit or head is similar in general structure to other machines employed for producing the "universal" or "V" wind, comprising a cam D, a winding-spindle 9, having a tube-holder of appropriate form, and a reciprocating guide $i$, movable to and from the tube-holder, to be maintained in contact with the surface of the package wound during the winding.

The winding-spindle 9 and the cam-shaft 25 are mounted in bearings in the frame A, the bearings I and J for the spindle being formed in the frame itself and the bearings for the cam-shaft in separate bushings V and W, forced into openings in the frame. Both spindle and cam shaft are driven from clutch-gears 12 and 12$^a$, which are operatively engaged with their respective shafts through the clutches 13 and 13$^a$. The latter are mounted on keys or splines to be moved freely longitudinally on their shafts for engagement with or disengagement from their gears 12 and 12$^a$. Engagement of the clutches with the gears is effected by the cup-shaped springs 15 and 15$^a$ and disengagement by the levers T and T', which are adapted to engage with beveled flanges 13$^\times$ on the clutches to wedge the latter back away from their gears.

The lever T is formed with a forked projection $t$, which is so posed relative to the flange of the clutch 13 that when moved to act upon said clutch it first engages with the flange to disengage the clutch from its gear and then bears with both sides of the fork on the clutch-flange and by wedging thereon acts as a brake to arrest the rotation of the spindle. The lever T' may be equipped with a similar forked projection when necessary, but is shown in the drawings with a projection $t'$, having only an inclined face to move the clutch without acting, essentially, as a brake.

Figure 3:
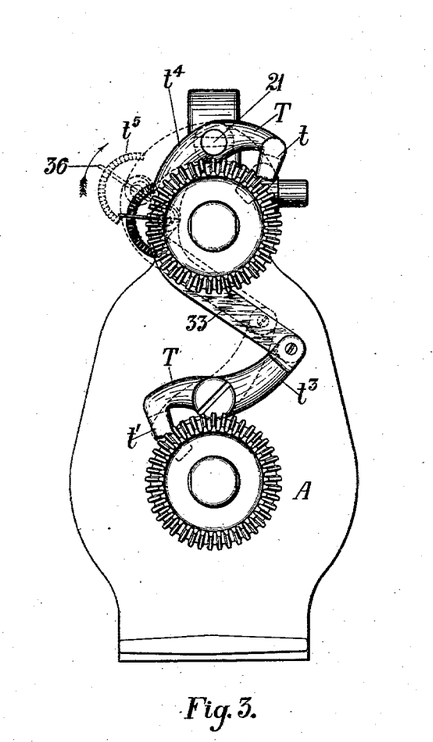
Fig. 3, an elevation of the end opposite that shown in Fig. 1 looking in the direction indicated by the arrow $b$, Fig. 2, and showing the clutch mechanism of the machine.
Figure 4:
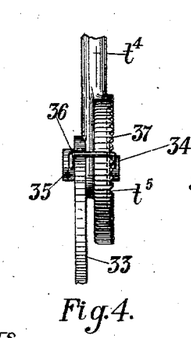
Fig. 4, an edge view of a portion of the upper clutch-lever, showing the ratchet in detail.
Figure 5:
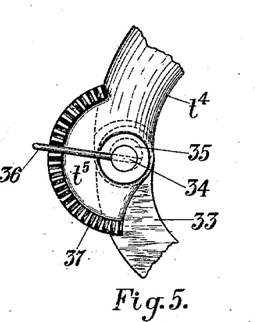
Fig. 5, a face view of the same, showing the eccentric adjustment for connection 33.

To insure coincident action of the levers T and T', an adjustable connection is provided between the two. This is essential to compensate for variations of dimension in manufacture and inequalities of wear incident to difference of conditions under which the spindle 9 and the shaft 25 operate. The spindle 9 operates at high speed and with a varying load, depending on the diameter of the package being wound, while the cam-shaft 25 rotates at relatively low speed. The connection 33 is joined to one of the levers T by means of an eccentric-pin, Figs. 3, 4, 5, one portion of which, 34, has a bearing in the lever T, in which it may be turned, while the other portion 35 has a bearing in the connection 33. The pin is turned to adjust the relative position and action of the levers T and T' by means of the arm 36, made in the form of a staple and which is retained at any point of its movement by notches 37, formed in the sector $t^5$, a projection of the lever T. The arm 36 is so made as to be retained in engagement with the notches 37 by its own elasticity and incidentally serves to retain the eccentric-pin from longitudinal movement in one direction, the large eccentric portion 35 preventing movement in the opposite direction. By rotating the arm 36 in the direction of the arrow, Fig. 3, the arm $t^3$ of the lever T' is separated from the arm $t^4$ of the lever T, causing a relatively later action of the lever T' than of the lever T.

The lever T is secured to a rod 21, which is mounted in bearings in the top of the frame A. A handle E' at one extremity of the rod provides means whereby the latter may be rocked by hand. A torsion-spring 18 serves to automatically rock the rod 21 to effect the disengagement of the clutches from their gears, and a lateral projection 45 from the handle E' engages a detent E, whereby the rod 21 is restrained from rocking under the action of the spring 18 while the machine is in operation. Means are provided whereby the clutches are mechanically disengaged from their gears to arrest the winding in case the yarn breaks or its supply becomes exhausted; but as these devices have been described in pending applications no detailed reference to them will be made here. Novel devices are, however, provided to mechanically arrest the winding without breaking the yarn when the latter fails to deliver because of a tangle in its supply or for any other cause. To effect this result, the yarn cannot pass directly from the supply to the winding spindle, but must be so diverted from such a direct path as to form a loop, passing a yielding member and returning to the line of travel from which it was diverted. Then when the delivery of yarn from the supply-package is stopped a sufficient length of yarn is contained in the loop to be taken up by the winding-spindle during the stopping of the machine. In taking up this loop of yarn the yielding member over which it passes is moved to engage connections of the stopping devices to arrest the winding. As the winding-spindle rotates at exceedingly high speed and as a certain period of time, though small, must elapse between the action of the yielding member on the stopping devices and the actual stopping of the winding, provision must be made so that after engaging the stopping devices the yielding element may continue its movement and the loop continue to deliver yarn to the winding-spindle during said short period of rotation. The yarn is drawn from swifts 62, supported at the top of the machine, and is carried down through the guide 91 of the traveler 90 and thence back again, forming the loop described, and through the tensions $c\ d$ and the reciprocating guide $i$ to the winding-spindle 9.

The traveler 90 is mounted on a vertical rod 92, which extends from the bracket 94 near the bottom of the machine to the tension-bracket A' and which is secured thereto by the small bracket 93. Between the traveler 90 and the bracket 93 is a long helical spring 96, so coiled as to permit an extended movement of the traveler 90.

Attached to the bottom of the tension-bracket A' is the lever 97, whose bottom extremity is adapted to be engaged by the traveler 90 in its upward movement and so posed that after having been thus engaged the traveler 90 may continue its upward movement, as above described. The upper extremity $97^a$ of the lever 97 engages a lever 98, which is mounted at the top of the tension-bracket A' and provided with a finger $98^a$, which engages a projection 99 on the detent E to shift the latter. An adjustment $98^c$ serves to take up any variation in the relations between the levers 97 and 98 and the traveler 90.

In case a skein becomes tangled and refuses to deliver its yarn the traveler is drawn upward as the loop of yarn is taken up by the winding-spindle until it engages the projection $97^b$. The latter is forced by the engagement away from the rod 92, causing its opposite end $97^a$ to operate upon the lever 98 and through the latter and the detent E to arrest the winding. The spring 96 and traveler 90 also serve to control the tension of the yarn as it is delivered from the swifts 62. The latter cause much unevenness in the delivery of the yarn because they are relatively massive, rarely well balanced, and because the arms or bars which support the yarn on the swifts are seldom equidistant from the axis of rotation. Because of its mass and consequent inertia so great a pull is required to start the swift rotating that ordinary yarns can be wound only with difficulty and fine yarns cannot be wound at all. Because of their lack of balance, the uneven disposition of the yarn, and the momentum incident to their mass the swifts frequently overrun and deliver such an excess of yarn that they nearly stop before the slack is all taken up for the lack of impetus to maintain their rotation. When the yarn is taken up, the sudden jerk due to suddenly accelerating the rotation of the swift is sufficient to either break the yarn or impart to the swift a fresh impulse to overrun. With the devices above described these irregularities are counteracted. When the winding is started, the yarn instead of breaking draws the traveler 90 upward while starting the swift to rotate until the latter attains its normal speed of rotation. If for any reason the swift tends to rotate irregularly, the traveler rises with each increase of resistance or moves downward to take up any slack in the yarn due to accelerated rotation of the swift.

The projection 97$^b$ is so posed that the traveler 90 will not engage therewith when moved by ordinary fluctuations of tension, but only when the delivery of the yarn from its supply entirely ceases on account of a tangle or for a similar cause.

Figure 14:
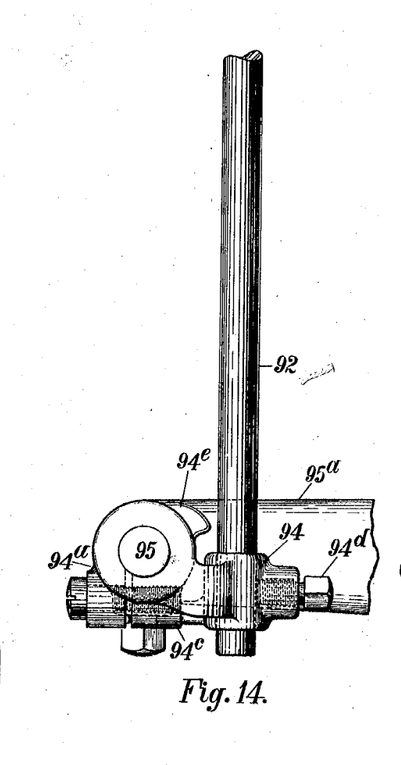
Figs. 14 and 15, details of the rod 92 and its bracket 94.
Figure 15:
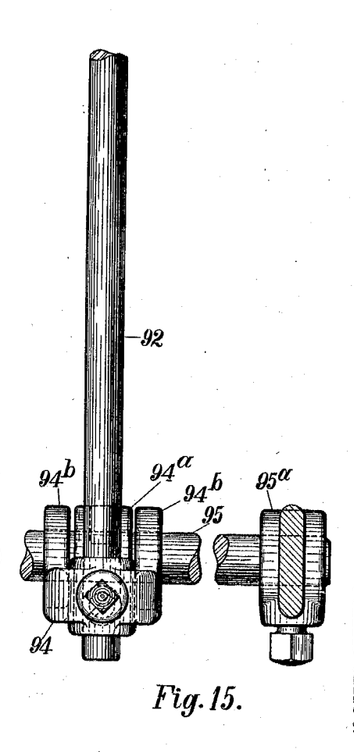
Figure 16:
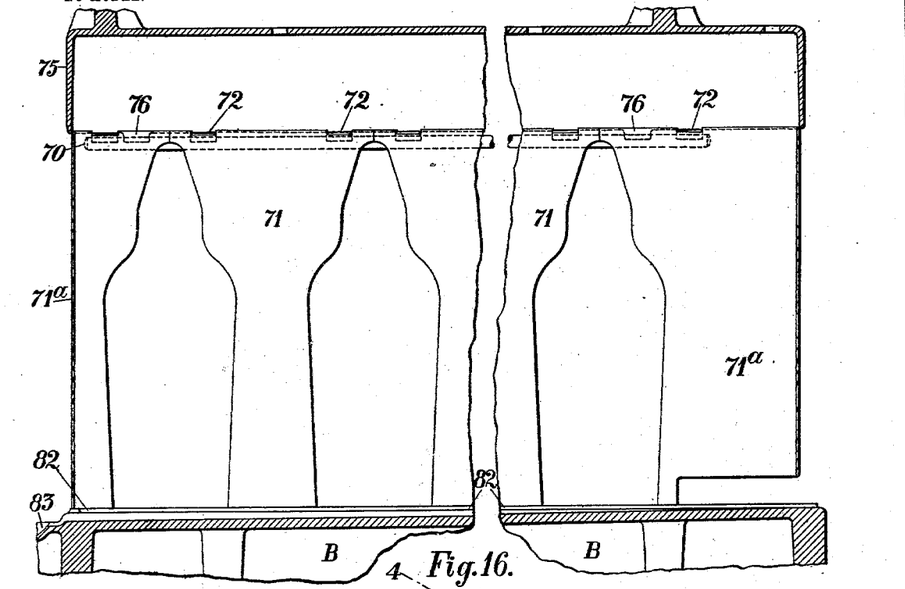
Fig. 16, an enlarged view showing the arrangement of the covers for the driving mechanism at either end of the bed B, being a section on the line 4 4 of Fig. 17.
Figure 17:
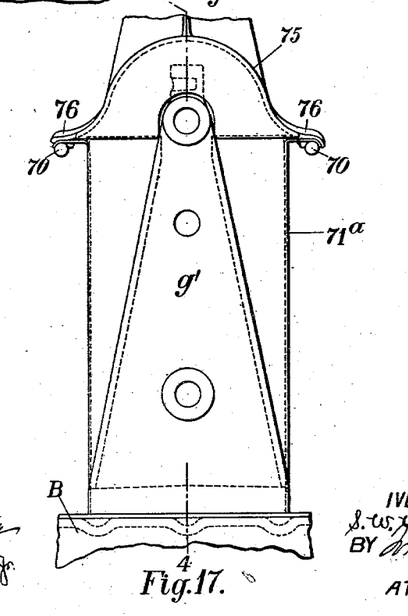
Fig. 17, an enlarged end view of the covers looking in the direction of the arrow, Fig. 6, with the gainer mechanism removed.

As different weights and sizes of yarns must be wound and as these are put up in skeins or other packages of various sizes and weights springs of different degrees of strength must be employed, and provision must be made whereby they may be readily removed and replaced. To this end the bracket 93 is made to simply receive the upper end of the rod 92 to restrain it from lateral play. The lower end is secured in the swinging bracket 94, which is mounted on the rod 95 and prevented from moving thereon by the collar 94$^a$, interposed between the two sides or wings 94$^b$ 94$^b$. The latter is secured to the rod 95 by any suitable means, as by the binder-screw indicated, and the rod 95 is supported from the legs of the machine by brackets 95$^a$. To remove one spring and apply another, it is simply necessary to loosen the fastening of the rod in its bracket 94, slip it down free of the bracket 93, and pull it forward. A stop 94$^e$ on the collar prevents the bracket 94 from moving too far and the rod from swinging forward farther than is necessary. Movement in the reverse direction is limited by the projection 94$^c$ of the collar 94$^a$, through which the binding-screw is passed. The advantage of this simple device is obvious. Were the rods 92 not limited in their movement the work of replacing the springs would be difficult. The rods would be liable to drop flat on the floor and be damaged and in any event would require one hand of the operator to hold them in position. With my novel arrangement the rod rests in its forward position adequately supported, while the operator can employ both hands in applying the spring. To restore the rod to its normal position, it is simply necessary to swing it back until stopped by its limitation, when it will be in line with the hole in the bracket 93. Then push the rod into place and secure it by the screw 94$^d$.

Figure 1:
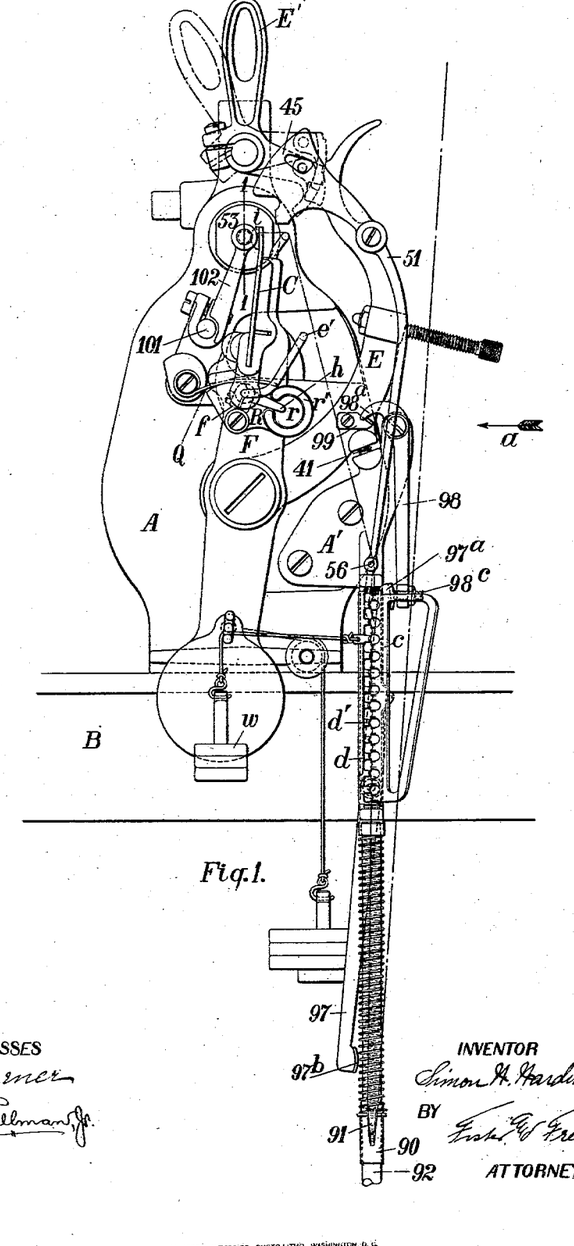
Figure 1 is an end elevation of one of the machines or heads.
Figure 2:
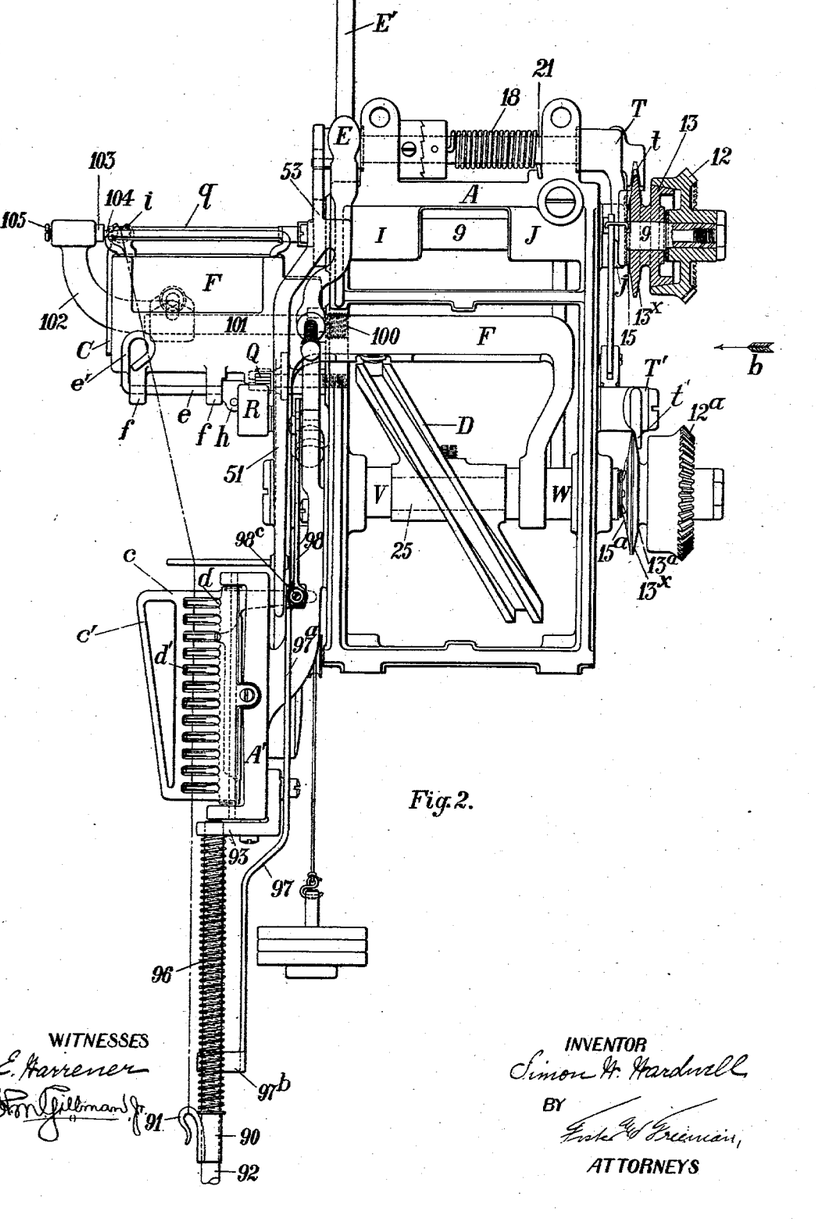
Fig. 2, a longitudinal elevation looking in the direction indicated by the arrow $a$, Fig. 1.
Figure 6:
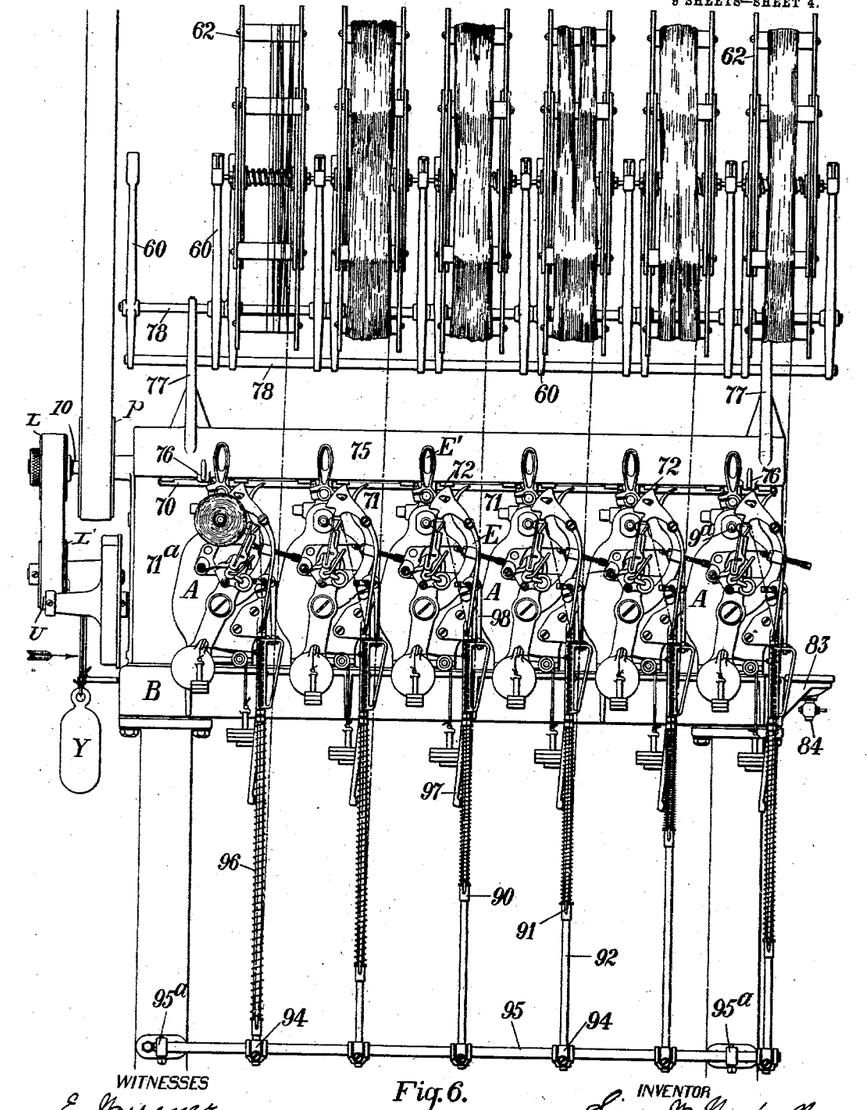
Fig. 6, a view showing the ends of a plurality of my machines arranged upon a single stand with a single gainer mechanism and adapted to wind from the swifts or reels supported above.
Figure 7:
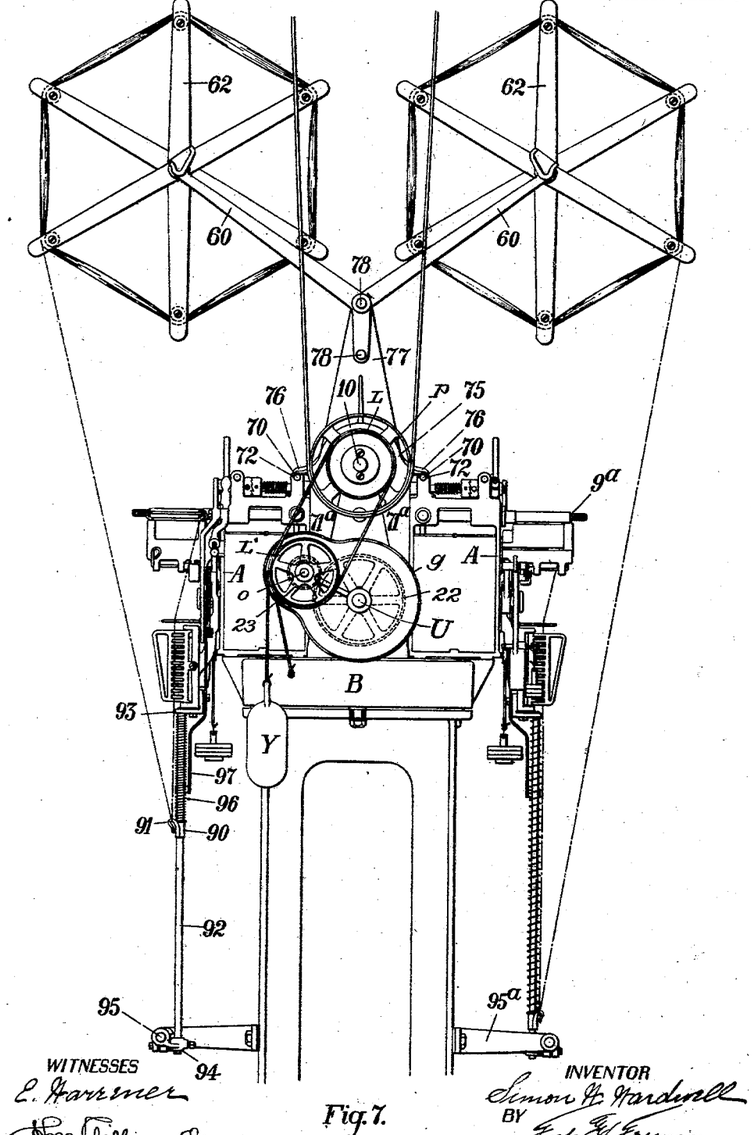
Fig. 7, another elevation of the same looking in the direction indicated by the arrow, Fig. 6.
Figure 8:
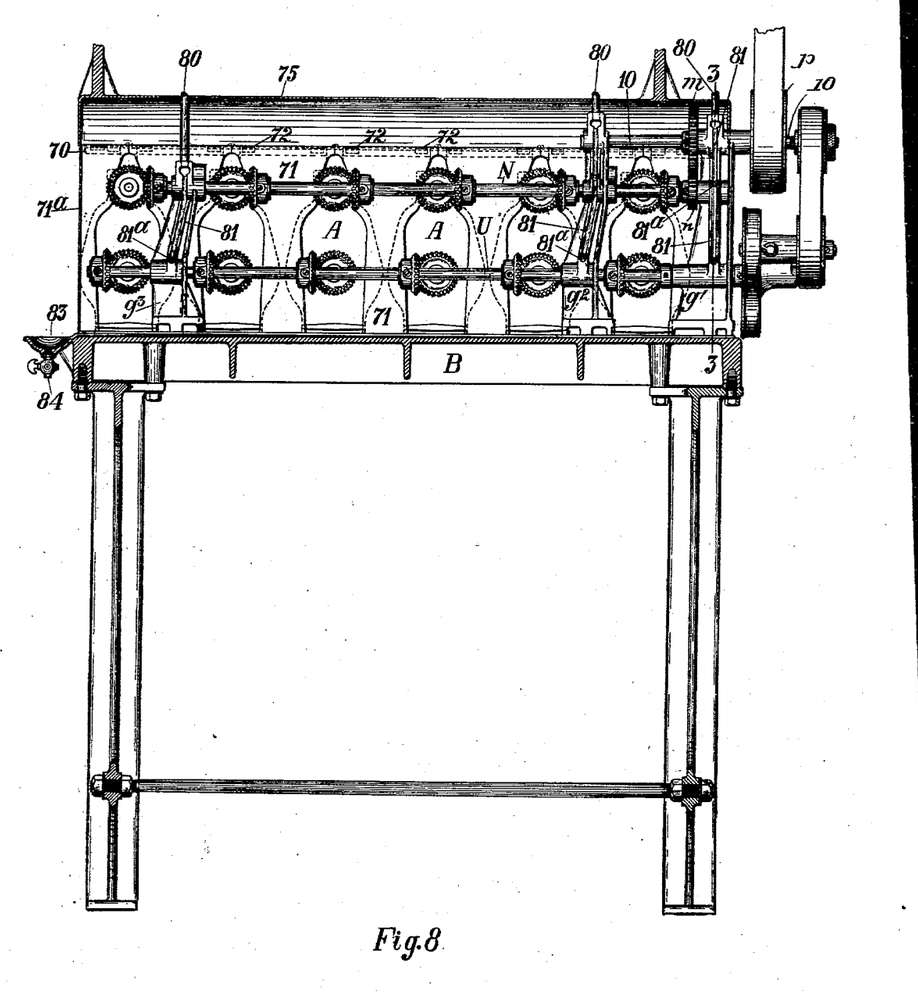
Fig. 8, a view looking in the opposite direction from that of Fig. 6, with one row of machines removed to show the driving mechanism and with the bed and covers shown in section to illustrate the oil-flows.
Figures 9, 10:
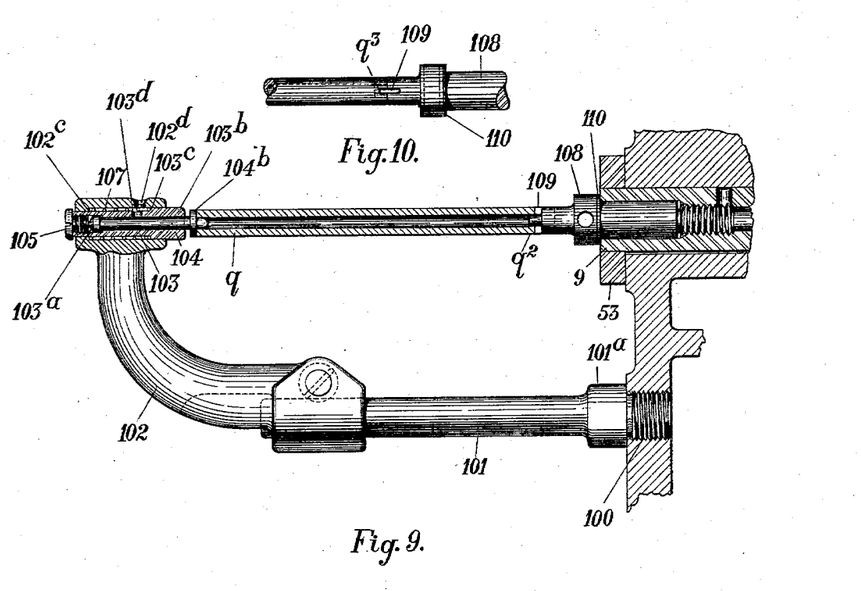
Fig. 9, a detailed view of one form of cop-tube-holder, partly in section, on the line 1 1, Fig. 1.
Fig. 10, a plan of a part of the same, illustrating the method of driving the tube.

Machines of the character described must frequently be used interchangeably on various kinds of work requiring different kinds of tubes on which the material will be wound. These tubes are in some cases thin paper shells which must be supported throughout their length by a mandrel or tube-holder. In some cases they are made of wood, fiber, or metal and with so small a bore that to support them on a mandrel is impracticable, and they must be supported by the ends on centers. Figs. 1 and 2 show my improved machine equipped with centers for supporting tubes of small bore, and Figs. 6 and 7 show the same machine with devices for supporting thin shell tubes. To accommodate these different conditions, the spindle 9 is terminated flush with the collar 53, Fig. 9, and is bored axially to receive the shank of the tube-holding device and tapped to secure the latter in place.

Where tubes of small bore are employed, a driving-center 108 is inserted in the end of the winding-spindle, its shoulder abutting the end of the spindle or a washer 110. Different conditions under which the cops or yarn-packages are employed demand provision for adjusting the distance the tube shall protrude beyond the end of the package, and for this purpose is the washer 110 interposed between the shoulder of the member 108 and the spindle 9. By employing no washer at all the greatest amount of protrusion of the tube is obtained. By employing a thick washer this protrusion may be reduced to a minimum by bringing the end of the center with the end of the tube close to the end of travel of the reciprocating thread-guide $i$. The hole through the enlarged shoulder portion of the center is made to receive a pin or wrench, whereby the center may be screwed snugly to its place. The end of the center is formed with a projection of a diameter to fit the bore of the tube $q$ and is also provided with a cross blade or driver 109, which fits a corresponding transverse slot in the end of the tube to positively drive the latter. The opposite end of the tube is supported by a live or rotatable center 104, mounted in bearings in a sleeve 103. The body of the center 104 is a straight spindle with a conically-pointed head 103$^a$, the point of which bears on a hardened screw 105, forming a substantially frictionless thrust-bearing for the center 104. The latter is secured in the end of the sleeve 103, and its head of larger diameter than the sleeve serves as a stop to limit the movement of the latter in one direction. At the opposite end of the center 104 is a small collar 104$^b$, which supports the end thrust of the tube $q$ and which is forced onto the center 104 after the latter has been inserted in its bearings in the sleeve 103.

The sleeve 103 is made of two diameters, which respectively fit corresponding bores in the top of the bracket 102. The portion of the sleeve 103 which is of larger diameter extends but a short distance into its bore, leaving a long annular recess between the shoulder 103ᶜ of the sleeve and the bottom 102ᶜ of the bore. In this recess is a helically-coiled spring, which presses the center 104 into engagement with the tube $q$, maintaining the slotted end of the latter in engagement with the driver 109. When a tube is to be inserted in the machine, its unslotted end is placed on the center 104 and the latter is pressed back, compressing the spring 107. The opposite end of the tube is then engaged with the driving-center 108 and rotated until the driving-blade 109 engages the slot in the end of the tube $q$. When the slot and the blade register, the spring 107 forces the tube $q$ to its place.

Oil-holes 102ᵈ in the bracket 102 and 103ᵈ in the sleeve 103 serve for the introduction of lubricant to the bearing of the center 104.

The bracket 102 is mounted on an arm 101 and adapted to be moved thereon to or from the driving-center 108 to accommodate the different lengths of tubes employed.

The arm 101 has a threaded portion 100 screwed into the main frame of the machine, the shouldered portion 101ᵃ of large diameter abutting a finished surface on the frame.

Figure 11:
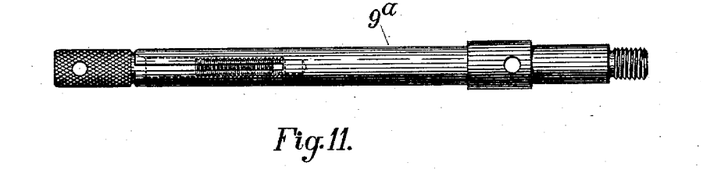
Fig. 11, a tube-holder for paper tubes.
Figure 12:
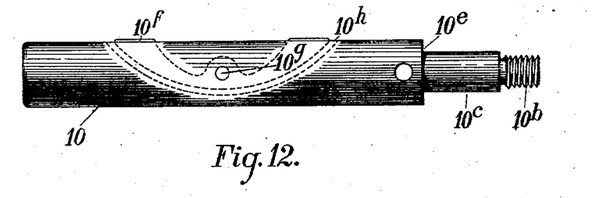
Fig. 12, an improved tube-holder for paper tubes.

To wind on shell-tubes, the bracket 102 and arm 101 are removed by unscrewing the latter from the frame, and the driving-center 108 is removed from the spindle 9. In its place is attached an appropriate tube-holder—as, for instance, an ordinary expanding tube-holder 9ᵃ of the form shown in Fig. 11; but I prefer to use one of novel structure. (Shown in Fig. 12.) The tube-holder 10 is formed with a narrow groove or slot 10ʰ, in which is mounted a spring-blade 10ᶠ, supported on the pin 10ᵍ and so posed that the bottom of the slot serves to limit the swing of the blade 10ᶠ. The tubes are secured by simply pushing them onto the tube-holder. As the end of the tube reaches the front end of the blade 10ᶠ the latter is depressed; but when the tube reaches the rear end of the blade the depression in the rear end forces the front end upward and both ends of the blade into engagement with the inner surface of the tube. The spring of the blade accommodates the latter to any ordinary variation in the diameter of the tubes, and a further advantage is gained from the fact that the tube is secured well within the package, where the thin shell is forced against the blade by the constriction of the yarn wound. When removing a full package, a slight movement of the latter entirely releases the spring-blade, only enough movement being required to draw the end of the tube free from the rear end of the blade. The spring-blade can of course be used with tubes like $q$, Fig. 9, adapted to be supported at both ends.

To restrain the traverse-frame F from returning to the spindle, a detent is provided, comprising a rotatable wedge R, pivoted to said frame and counterweighted at $r$, and an arc Q, pivoted to the main frame A of the machine and adapted to be pressed into frictional contact with the traverse-frame F by the rotatable wedge. About the edge of the counterweighted portion is formed a rim $r'$, open at one point. Passing through this opening and engaging said rim is an arm or finger $h$, attached to the rod $e$, which is mounted in bearings $ff$ in the traverse-frame F and formed at its outer end as a handle $e'$, whereby the detent R may be shifted.

Where swifts are employed for a supply, they are supported on brackets 60 60, which are mounted on rods 78 78. The latter are secured in vertical uprights 77, that rise from the top of the arched cover 75, which extends the length of the machine over the back shafts and connected gearing. The cover 75 is supported by arms 76 76, which rest on tie-rods 70, that extend through lugs or projections on top of each machine-frame A A, Figs. 6, 7, 16, and 17.

To further protect the gearing from lint and dirt, plate-covers 71 are supported by hooks 72 72 from the rods 70, Figs. 6, 8, 16 and 17, extending downward toward the bed of the machine and fitted to cover the spaces between the heads. The covers 71ᵃ at the ends of the bed are formed with lateral extensions to fill the spaces between the side covers. Those at the gainer end—the right-hand end as viewed in Fig. 8—have triangular wings adapted to lap the ribs of the standard $g'$, filling the space between the latter and the side covers. At the opposite end the bent portion extends entirely across the space between the two end covers, being integral with both.

Figure 13:
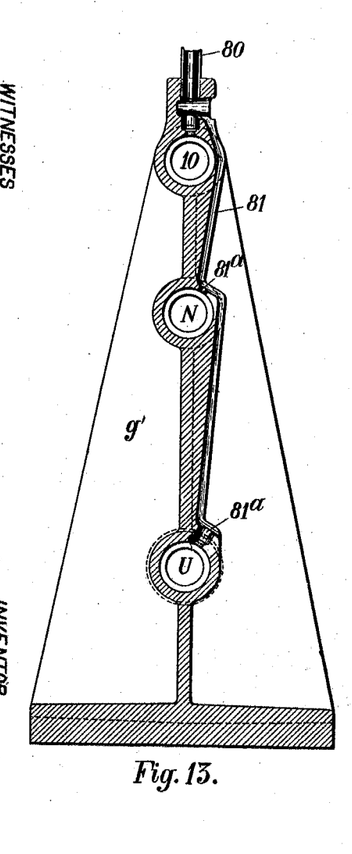
Fig. 13, a sectional view of standard $g'$, taken on the lines 3 3, Fig. 8.

The back shafts 10, N, and U are lubricated by novel means. (Particularly shown in Figs. 8 and 13.) These shafts are mounted to turn in bearings in the standards $g'$, $g^2$, and $g^3$, one of which, $g'$, is shown in Fig. 13 in section. Through the top of the cover 75 oil-ducts are led to the top bearings in said standards. The upper part of each standard is formed with a lateral recess just above the bearing, which constitutes a kind of hood. Through the top of this hood is drilled the hole to receive the oil duct or pipe 80, which hole is continued beyond the recess to make the oil-inlet to said top bearing. From this inlet a channel or groove 81 leads to the bearing next below and from there to the bearing next below that, the oil-inlets to these various bearings being indicated by the character 81ᵃ. The operation of this system is as follows: Oil is introduced into the duct 80 in copious supply, which fills the top bearings and overflows the oil-inlet and then following down the channel 81 enters the bearings next below. Whatever surplus remains again follows the channel 81 to the bottom bearing, whence any excess drips to the bed of the machine. The top of the bed is inclined from end to end, so that any entrained oil flows to the catch-basin 83, which is formed at one end of the bed B and from which the oil may be removed through the drip-cock. About the edges on the top of the bed is formed a rim or ledge 82, which prevents the oil from overflowing its sides.

The gainer mechanism, to which reference has been made, comprises devices whereby the relative speed of the spindles and cam-shafts may be governed. The shaft 10 is mounted in bearings in the bracket $g'$. Adjacent the outer end of the bearings is located the driving-pulley $p$, and adjacent the driving-pulley is an expansible pulley L. The opposite end of the shaft 10 is connected with the back shaft N through the gears $m$ and $n$, Fig. 8.

The back shaft U extends beyond the bracket $g'$ and supports a gear 22 and also a swinging frame $g$, which serves to cover said gear and also to support the shaft $o$. The latter carries at one end a gear 23, which meshes with the gear 22, and at the other a pulley L', which is connected with the expansible pulley L, above referred to, Fig. 7. This mechanism has been described and illustrated in detail in my Patent No. 690,492, granted January 7, 1902.

What I claim is—

1. The combination in a winding-machine with a winding-spindle, starting and stopping devices, of a rotating yarn-supply, a traveler engaged by the yarn, a spring connected with the traveler to permit the latter to yield at any resistance to the delivery of the yarn, and connections with the stopping devices to be engaged by said traveler to cause the arrest of the winding and which permit the traveler to continue its movement after said engagement.

2. The combination in a winding-machine with a winding-spindle, reciprocating guide, starting and stopping devices, a spring-pressed traveler through which the yarn passes on its way from the supply to the winding-spindle, and which is adapted to engage the stopping devices to arrest the winding and to continue its movement after said engagement.

3. The combination in a winding-machine with a winding-spindle, stopping devices, tension devices and rotating supplies, of devices for diverting the yarn from its direct path from the supplies to the tension devices including an elastically-yielding traveler, to be moved by the yarn, upon resistance of the supply to deliver its yarn, to engage the stopping devices and to continue its movement after such engagement in the manner and for the purpose substantially as described.

4. The combination in a winding-machine with a winding-spindle, reciprocating guide and rotating yarn-supplies, of a rod 95, bracket 94 supported on and adapted to turn on the rod 95, and having bearings for said rod in side portions $94^b$, a collar $94^a$ secured to the rod 95 between said side portions and having a projection to limit the turning of the bracket 94, a rod 92 secured to said bracket, carrying a traveler 90, and a helical spring 96, and a bracket 93 to restrain the rod 92 from being shifted during the winding in the manner and for the purpose substantially as described.

5. The combination in a winding-machine with a winding-spindle, a reciprocating guide, and tension devices, of a substantially vertical rod 92, a bracket 93 to engage the top of the rod to prevent it from being shifted from alinement with the tension devices, a bracket 94 in which the bottom of said rod is secured and which is supported on a rod 95, and a collar $94^a$ secured to the rod 95 to maintain the bracket 94 in place on said rod, substantially as described.

6. The combination with the bracket 94 rotatively supported on a horizontal rod 95 and having side portions $94^b$, a rod 92 secured in said bracket, a collar $94^a$ secured between said side portions to the rod 95, having a stop $94^c$ to limit the movement of the bracket 94 rotatively in one direction to locate the rod 92 in a substantially vertical position, and having a second projection $94^e$ to limit the movement of the bracket to shift said rod from its vertical position.

7. The combination in a winding-machine with a winding-spindle, reciprocating guide, cam to actuate the guide, stopping devices, and detent E to withhold said stopping devices from action to arrest the winding, of a lever 97, and a traveler 90 to pass by one end of the lever 97 and, in passing, to operate on said lever to effect the shifting of the detent E and cause the winding to be arrested, substantially as described.

8. The combination in a winding-machine with a winding-spindle, reciprocating guide, cam to actuate the guide and a traverse-frame F to independently carry the guide and permit it to be moved to or from the winding-spindle, of a detent to control the return of said frame toward the spindle, comprising a rotatable wedge R pivotally mounted on said frame, and having a counterweight portion $r$ formed with a circular rim about its edge, and an opening through said rim, a rod $e$ mounted in bearings in the traverse-frame F, having its outer end formed as a handle $e'$ and having, attached to its inner end, a finger $h$ to enter the opening in the rim of the counterweight $r$, in the manner and for the purpose, substantially as described.

9. The combination in a winding-machine with a winding-spindle, reciprocating thread-guide, cam to actuate the thread-guide and shaft to rotate said cam, of clutch-wheels which may rotate freely on said spindle and shaft, and clutches to connect them therewith, of a lever T to be rocked to shift one of the clutches, a lever T' to be moved from the lever T to shift the other clutch and an adjustable connection between the two levers, substantially as described.

10. The combination in a winding-machine with a winding-spindle, reciprocating guide, cam to actuate the guide and shaft to rotate the cam, clutch-wheels which may rotate on said spindle and shaft, and clutches to connect them therewith, of a lever T to be rocked to shift one of the clutches and having a circular sector $t^5$ with teeth 37, a lever T' to shift the other clutch, a connection 33 between the levers, an eccentric-pin to join said connection to one of the levers, and an arm 36 secured to said pin to move the latter and adapted to engage the teeth 37 to be locked in position, substantially as described.

11. The combination in a winding-machine with a spindle and cam-shaft, of clutch-wheels rotatable on the same, clutches carried on and rotatable with said spindles and cam-shafts, levers T and T' adapted to be rocked into engagement with said clutches to release them from engagement with their clutch-wheels, a connection between the levers, a toothed sector forming part of one of the levers, an eccentric-pin substantially concentric with the sector and joining its lever and said connection, and a staple-shaped arm to shift said eccentric-pin and so attached thereto as to prevent its movement longitudinally in one direction.

12. The combination in a winding-machine with a reciprocating guide $i$ and a rotating spindle having an internally-screw-threaded, axial bore, of a separable tube-holder 10 fitted to said bore and having a swinging spring-blade $10^f$, substantially as described.

13. In an outbearing for a tube, a bracket, a sleeve movable longitudinally in said bracket, a spring to press said sleeve in one direction, a shoulder to limit its movement in said direction, a rotatable center movable longitudinally with said sleeve and having bearings therein, having a collar to bear against the end of the tube and a cylindrical projection to enter the bore of the tube to support the latter, substantially as described.

14. In an outbearing for a quill-tube, a bracket 102, a sleeve movable longitudinally in said bracket, a screw secured in the end of said sleeve limiting the longitudinal movement of the latter, a spring to move the sleeve to said limitation, and a rotatable center with bearings in said sleeve and a conical end bearing, and having a projection to enter the bore of the tube and collar to bear against the end of the tube, substantially as described.

15. The combination in a winding-machine with rows of individual winding-heads and one common gainer mechanism from which to drive and control said heads, of shafts driven from said gainer mechanism and connecting the latter with said heads mounted in bearings in brackets, each bearing having an oil-inlet, and each inlet connected with that of the bearing above by a channel to conduct the overflow of oil from an upper bearing to the bearings below it, substantially as described.

16. The combination in a winding-machine with rows of individual winding-heads, one common gainer mechanism from which to drive and control said heads, of shafts driven from said gainer mechanism connecting the latter with the heads and mounted in bearings in brackets, oil-inlets to the bearings in each bracket and channels connecting said inlets, an arched cover over the shafts and ducts leading from the outside of said cover to the top bearing of each bracket, and a bed, common to all the heads and to the gainer mechanism, having a rim or ledge to retain all entrained oil and having its top inclined toward one end and with a catch-basin at said end, substantially as described.

17. The combination in a winding-machine, of a bed, a plurality of winding-heads arranged in two rows on said bed, a gainer mechanism, back shafts and gearing to connect said gainer mechanism with the winding-heads, of an arched cover supported from said heads over the back shafts and gearing, vertical arms rising from said cover, rods mounted in the tops of said arms and brackets secured to said rods to support swifts, substantially as described.

18. The combination in a winding-machine with a bed, a gainer mechanism and winding-heads mounted on the bed, of winding-spindles and cams in the winding-heads, back shafts and gearing to connect said winding-heads with the gainer mechanism to operate said winding-spindles and cam-shafts therefrom, stopping devices whereby each winding-head may be disengaged from the back shaft, rotating supplies, elastically-yielding travelers adapted to be moved on resistance of delivery of the yarn to the winding-spindle, connections with the stopping devices to be operated from said traveler and to permit a further movement of said traveler after said engagement, substantially as described.

In testimony whereof I have signed my name to this specification in the presence of two subscribing witnesses.

SIMON WILLARD WARDWELL.

Witnesses:
JOSHUA B. HALE,
CHARLES A. EDDY.